United States Patent
Ratan et al.

(10) Patent No.: US 6,421,738 B1
(45) Date of Patent: Jul. 16, 2002

(54) METHOD AND SYSTEM FOR CAPTURING AND ENCODING FULL-SCREEN VIDEO GRAPHICS

(75) Inventors: Maithreyi Lakshmi Ratan, Bellevue; Thomas W. Olsen, Issaquah, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/892,924

(22) Filed: Jul. 15, 1997

(51) Int. Cl.[7] .................................................. G06F 9/00
(52) U.S. Cl. ........................ 709/328; 345/522; 717/127
(58) Field of Search ................................ 709/302, 304, 709/300; 345/501, 507, 522, 121

(56) References Cited

U.S. PATENT DOCUMENTS

| | | | | |
|---|---|---|---|---|
| 5,355,493 A | * | 10/1994 | Silberbauer et al. | 717/136 |
| 5,475,843 A | * | 12/1995 | Halviatti et al. | 717/124 |
| 5,487,172 A | * | 1/1996 | Hyatt | 712/32 |
| 5,796,413 A | * | 8/1998 | Shipp et al. | 345/522 |
| 5,889,518 A | * | 3/1999 | Poreh et al. | 345/804 |
| 5,893,053 A | * | 4/1999 | Trueblood | 702/187 |
| 5,898,441 A | * | 4/1999 | Flurry | 345/546 |
| 6,047,123 A | * | 4/2000 | Brown et al. | 717/127 |

OTHER PUBLICATIONS

Crain, Dennis, "Enhanced Metafiles in Win32," Microsoft Developer Network Technology Group, created Jun. 10, 1993, pp. 1–10.

* cited by examiner

Primary Examiner—St. John Courtenay, III
Assistant Examiner—Lewis A. Bullock, Jr.
(74) Attorney, Agent, or Firm—Merchant & Gould

(57) ABSTRACT

A method and system for encoding video graphics of displayed on a monitor of a computer system. Graphical API function calls are hooked so that when a graphical API routine is called the graphical API function call that called the graphical API routine will be diverted to an encoding subroutine in a screen capture program module. Under the control of the encoding subroutine, the graphical API call is unhooked. A determination is made whether any initial state parameters of the screen need to be stored and, if so, then the initial state parameters are stored in records. The graphical API function call is then called. If the graphical API function call was successfully executed and directed to the screen, then a determination is made whether any dependent objects of the graphical API function call need to be stored. If so, then these dependent objects are stored in records. The graphical API function call is then stored in a record.

12 Claims, 7 Drawing Sheets

| | |
|---|---|
| 0x5632 | 0 |
| 0x1320 | 1 |
| 0x0000 | 0 |
| 0x0000 | 0 |
| 0xF500 | 1 |

FIG. 3

METHOD AND SYSTEM FOR CAPTURING AND ENCODING FULL-SCREEN VIDEO GRAPHICS

TECHNICAL FIELD

This invention relates to screen capture video. More particularly, this invention relates to a method and system for capturing and encoding full-screen video graphics into an electronic file.

BACKGROUND OF THE INVENTION

With the release of new versions of computer program modules, such as word processing program modules and spreadsheet program modules, even experienced computer users may need tutoring on the new features of a recently-released version of a program module. Thus, tutorials and demonstrations are a vital part of training programs that are conducted when a program module is released. Screen capture video is often used in connection with these tutorials and demonstrations so that the audience is able to see an accurate visual representation of the screen when certain selections and features of the program module are executed. For example, prior to a tutorial, a tutor may execute certain selections and features of a program module and capture these selections using a screen capture video program module. The video may then be replayed during the tutorial. Thus, during the tutorial, the tutor is free to concentrate on the tutorial while demonstrating features of the program module by simply playing the screen capture video.

Most existing screen capture video program modules capture video by "grabbing" a raster bitmap image of the display screen at a fixed time interval, such as every 1/10th of a second. However, screen capture video program modules that sample at fixed time intervals suffer from some drawbacks. One drawback of sampling the screen at a fixed time interval is that changes that occur in the time period between the samples are not captured. For example, suppose the screen capture video program module captures the screen at time (n) and time (n+10 ms). If the user is dragging a cursor across the screen, any movement of the cursor between time (n) and time (n+10 ms) is not captured. The playback of the screen capture video is jerky because of the uncaptured data.

Some screen capture video program modules store the captured raster bitmap images, or frames, as raw and uncompressed data. Storing the captured frames as raw and uncompressed data suffers from several drawbacks. A single 640× 480 resolution frame will typically exceed 307,200 bytes in length (and considerably more bytes at higher bit depths and resolutions). Thus, one drawback of storing captured frames as raw and uncompressed data is that the disk subsystem generally cannot effectively process the volume of data being written out during capturing and the volume of data being read in during playback. Thus, there are delays and slowdowns in the computer system.

An alternative screen capture video method that has been developed is to use difference analysis to store captured frames instead of storing the captured frames as raw and uncompressed data. Difference analysis comprises determining the pixel differences between a current captured frame and a previous captured frame and saving only those pixels that have changed. However, difference analysis suffers from several problems of its own. One problem with difference analysis is that it requires the storage of the previous frame in a copy buffer which occupies valuable and limited memory space. Another problem with difference analysis is that the comparison between the previous captured frame and the current captured frame requires much the bandwidth of the processing unit in a computer system. Thus, other applications that require the processing unit are slowed down, and the computer system appears to be running slowly and inefficiently to the user.

In addition to the problems outlined above, still another problem with existing screen capture video program modules is their inability to detect palette changes. In other words, when the color of an object on the screen is changed, existing screen capture video program modules typically will not detect this change and color mismatches occur.

There is a need in the art for a method and system that captures screen frames without losing any of the actions that occur on the screen. In other words, there is a need in the art for a lossless screen capture video program module. There is still a further need in the art for a method and system for capturing screen movements that reduce the amount of memory and disk storage required for a given screen capture video. There is also a need in the art for a screen capture video method that accurately portrays the palette colors displayed on the screen and that does not result in color mismatches.

SUMMARY OF THE INVENTION

The present invention satisfies the above described needs by providing a system and method for capturing and encoding full-screen video graphics. Generally described, the present invention provides a computer-implemented method that captures and encodes all of the API function calls that call routines which change the screen of a monitor.

In one aspect, the present invention provides a method for encoding video graphics of a computer system including a monitor. The video graphics are displayed on the monitor by a number of graphical application programming interface (API) routines. The graphical API routines are executed in response to a plurality of graphical API function calls. The method comprises hooking all of the graphical API function calls so that when one of the graphical API routines is called the graphical API function call will be diverted to an encoding subroutine. Under the control of the encoding subroutine, the graphical API function call is unhooked. A determination is made whether any initial state parameters need to be stored and, if so, then the initial state parameters are stored in records. The graphical API function is then called and executed. A determination is made whether the graphical API function call was successfully executed and, if not, then the hook is restored to the graphical API function call. However, if the graphical API function call was successfully executed, then determining whether the graphical API function call was directed to the monitor and, if not, then the hook to the graphical API function call is restored.

If the graphical API function call was directed to the monitor, then a determination is made whether there are any dependent objects of the graphical API function call that need to be stored. If so, the dependent objects are stored in records. The graphical API function call is then stored in a record.

In yet another aspect, each graphical API function call may be hooked by determining a memory address of the graphical API routine associated with the graphical API function call. The memory address, or logical code page, for the graphical API routine in memory is fixed in memory. The bytes of the graphical API routine that are to be overwritten are saved. The bytes of the graphical API routine are then overwritten so that the graphical API function call will be directed to a screen capture video program module. The graphical API function call is hooked after the above steps.

In still another aspect, the step of determining whether the graphical API function call was successfully executed may be accomplished by checking the return code of the graphical API function call.

In another aspect, the step of determining whether there are any dependent objects of the graphical API function call that need to be stored may be accomplished by determining whether a dependent object of the graphical API function call is dirty and, if so, then storing a new record for the dependent object.

These and other features, advantages, and aspects of the present invention may be more clearly understood and appreciated from a review of the following detailed description of the disclosed embodiments and by reference to the appended drawings and claims.

BRIEF DESCRIPTION OF THE DRAWINGS

FIG. 3 is an illustration of a table of graphical objects for tracking changes to graphical objects.

Detailed Description

Figure 1:
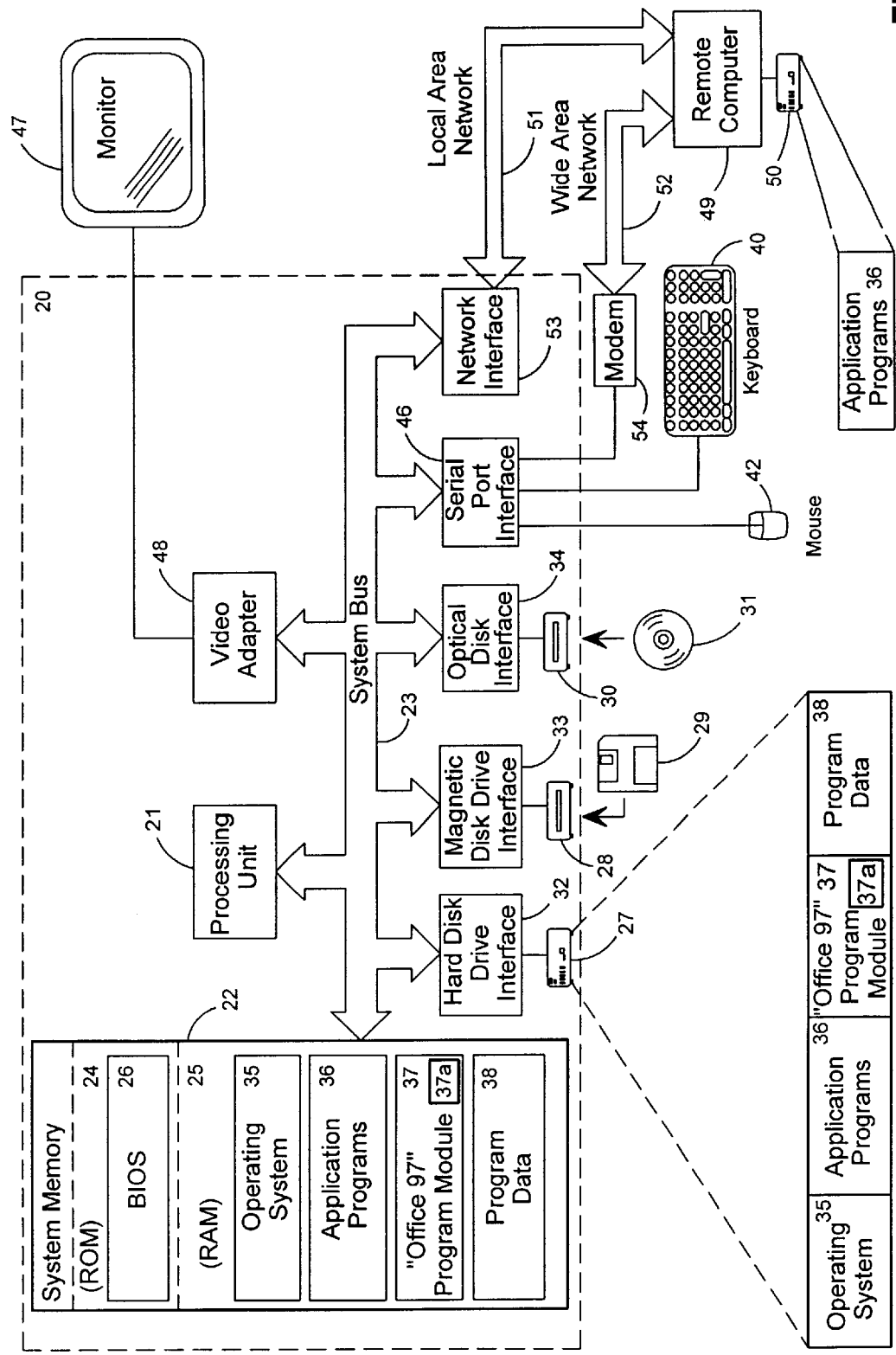
FIG. 1 is a block diagram of a computer that provides the operating environment for an exemplary embodiment of the present invention.

The present invention is directed to a method and system for capturing and encoding full-screen video graphics into an electronic file. In one embodiment, the invention is incorporated into "OFFICE 97", marketed by Microsoft Corporation of Redmond, Wash. Briefly described, "OFFICE 97" is a suite of word processing, spreadsheet, presentation, database, and time management application programs along with program modules that integrate and enhance these application programs. "OFFICE 97" includes a unique, lossless screen capture video program module known as GDICAP Screen Capture, or GDICAP, that captures and encodes full-screen graphics into an audio video interleaved (AVI) file. The video may be played back with a standard AVI viewer.

Exemplary Operating Environment

Referring now to the drawings, in which like numerals represent like elements throughout the several figures, aspects of the present invention and the exemplary operating environment will be described.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, such as an "OFFICE 97" program module 37, program data 38, and other program modules (not shown). The "OFFICE 97" program module 37 may include a screen capture video program module 37a.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Before proceeding with a description of the present invention, it will prove helpful to briefly describe an application programming interface and the audio video interleaved (AVI) file format.

Application Programming Interface (API)

An application programming interface (API) is a set of routines that an application program module requests to carry out lower-level services performed by the operating system of a computer. Typically, an application program module carries out two types of tasks: those related to work being performed, such as accepting text or numbers input to a document, and those related to maintenance chores, such as managing files and displaying information on screen. Generally, the maintenance chores are performed by the computer's operating system, and an API provides the application program module with a means of communication with the operating system, instructing it which system-level task to perform and when. An API also helps an application program module manage windows, menus, icons, etc.

An API function call may be sent from an application program module or an operating system to define the API routine that is to be executed. The API function call may contain many different parameters that may be needed by the API routine that was called. Some of these parameters may be dependent objects, such as a cursor or palette, that are to be moved or changed on screen.

Audio Video Interleaved (AVI) File Format

Audio video interleaved (AVI) is a file format for digital video and audio. The AVI file format is cross-platform compatible allowing AVI files to be played under the "WINDOWS 95" operating system and other operating systems.

Having briefly described an application programming interface (API) and the audio video interleaved (AVI) file format, a description of the present invention is presented below.

Capturing and Encoding Full-Screen Video Graphics

Briefly described, the present invention provides a method and system for capturing and encoding full-screen video graphics into an electronic file. The present invention does not sample raster bitmap images. Instead, graphical API routines are "hooked" so that any graphical API function call, such as from an application program module or the operating system, will be intercepted and delivered to a screen capture program module, such as screen capture program module 37a. The graphical API function call, dependent graphical objects and initial state parameters may be recorded as records for subsequent decoding and playing. The present invention conserves computer resources because recording is tied explicitly to what is displayed on the screen. The present invention also allows capturing of screen activity occurring across numerous applications at once. The invention in one embodiment, basically runs as a capture device driver within the Microsoft Video for Windows architecture. The invention hands back frames to Video for Windows and those frames are automatically saved in an AVI file.

Figure 2A:
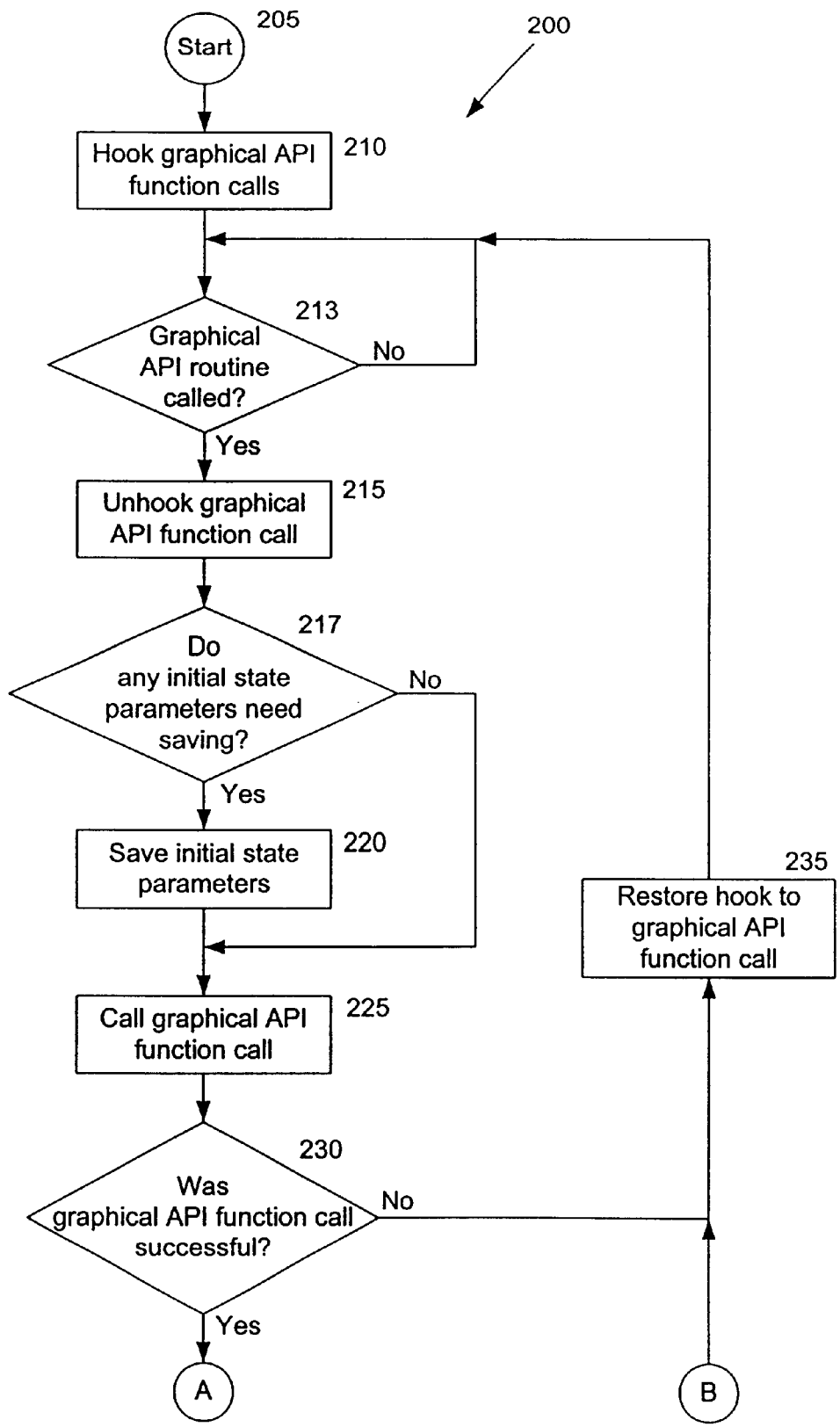
FIGS. 2A and 2B are flowcharts illustrating a method for capturing and encoding full-screen video graphics in accordance with an embodiment of the present invention.
Figure 2B:
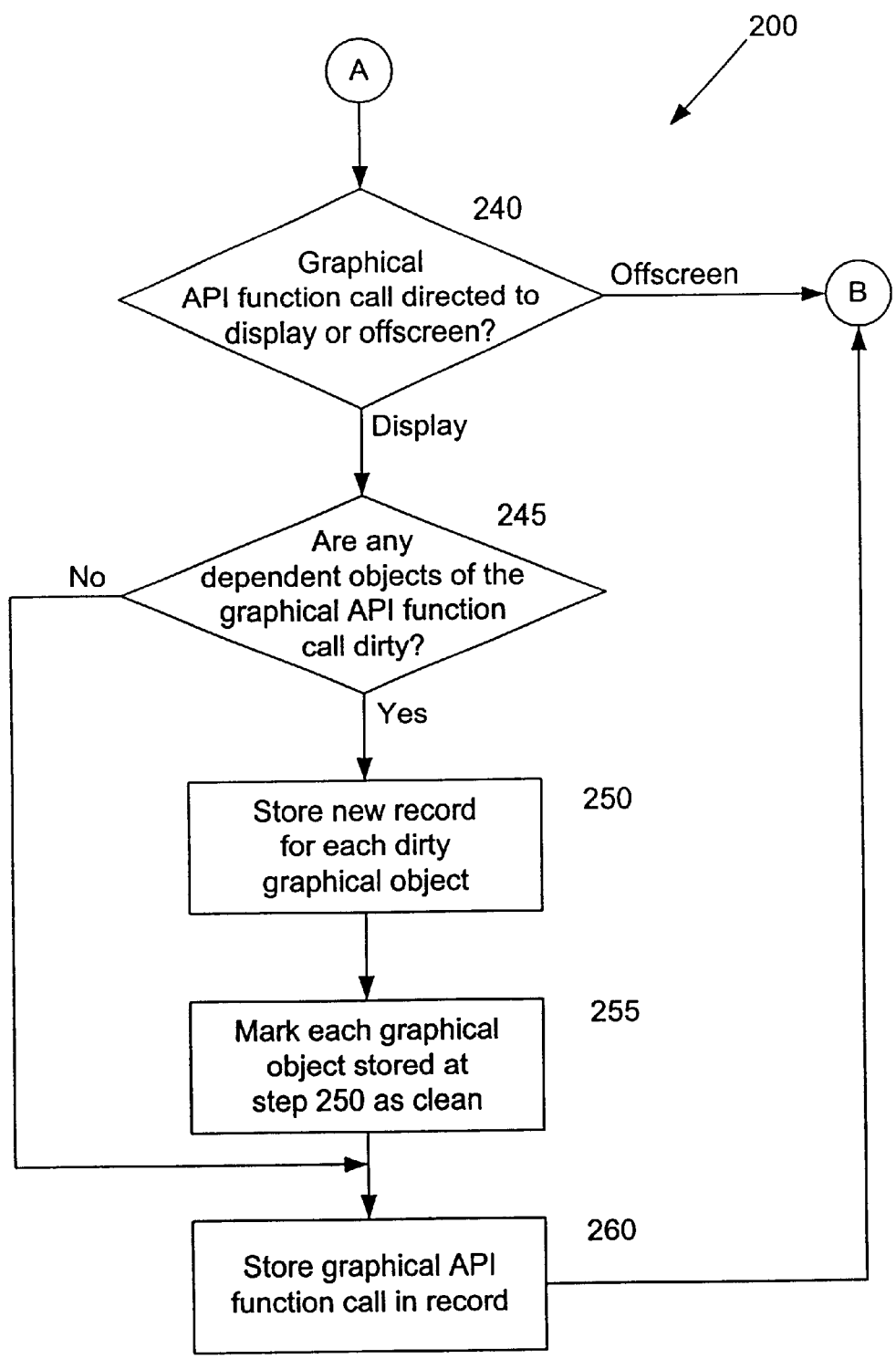

FIGS. 2A and 2B are flowcharts illustrating a method 200 for capturing and encoding full-screen video graphics in accordance with an embodiment of the present invention. Those skilled in the art will appreciate that this exemplary embodiment is a computer-implemented process that is carried out by the computer in response to input from the user and instructions provided by an application program module.

Referring now to FIG. 2A, a method 200 for capturing and encoding full-screen video graphics in accordance with an embodiment of the present invention will be described. The method 200 begins when the screen capture program module 37a is called to begin capturing and encoding the full-screen graphics displayed on monitor 47. In one embodiment, method 200 may be called after a user selects a "RECORD" button displayed on monitor 47 by screen capture program module 37a. The "RECORD" button may be displayed as a component of a remote control-type icon (not shown) displayed on monitor 47. The remote control-type icon may include other buttons that control functions of the screen capture program module 37a, such as a "STOP" button, a "PLAY" button, etc.

The method 200 begins at step 205 and proceeds to step 210 where all graphical API function calls are hooked. A graphical API function call comprises a function call that calls a graphical API routine. The graphical API routine may delete a graphical object from the display of monitor 47, add a graphical object to the display of monitor 47, move a graphical object on the display of monitor 47, etc. In other words, at step 210, any API function call that calls a routine that will change the display on monitor 47 is "hooked". Hooking a graphical API function call preferably means that anytime the "hooked" graphical API function call is sent from an application program module or the operating system, the graphical API function call will be diverted to, or jump to, an appropriate subroutine of the screen capture program module 37a. One method for hooking graphical API function calls is described in reference to FIG. 4. The following graphical API function calls are typically hooked:

FILLRGN
FRAMERGN
INVERTRGN
PAINTRGN
ARC
LINETO
MOVETO
POLYLINE
CHORD
DRAWFOCUSRECT
ELLIPSE
FILLRECT
FRAMERECT
INVERTRECT
PIE
POLYGON
POLYPOLYGON
RECTANGLE
ROUNDRECT
BITBLT

EXTFLOODFILL
FLOODFILL
PATBLT
SETPIXEL
STRETCHBLT
SETDIBITSTODEVICE
STRETCHDIBITS
EXTTEXTOUT
TEXTOUT
DRAWTEXT
TABBEDTEXTOUT
FASTWINDOWFRAME
REALIZEPALETTE
DELETEOBJECT
SETCURSOR
SHOWCURSOR
SCROLLDC
SETMAPMODE
SETEXTENTS
SETVPORTORG
SETWNDORG
SETBKMODE
SETBKCOLOR
SETROP2
SETTEXTCOLOR
SETTEXTALIGN
SETTEXTJUSTIFICATION
SETBRUSHORG
SETPOLYFILLMODE
CREATEBRUSHINDIRECT
CREATEFONTINDIRECT
CREATEPATTERNBRUSH
CREATEPENINDIRECT
CREATEBITMAPINDIRECT
CREATERGNINDIRECT
CREATEDIBINDIRECT
WMMOUSEMOVE

Still referring to FIG. 2A, the method 200 proceeds to decision step 213 after all of the graphical API function calls are hooked at step 210. Decision step 213 is essentially an endless loop that is exited when one of the graphical API routines is called via a "hooked" graphical API function call. Once one of the graphical API routines is called by a "hooked" graphical API function call, the hook created at step 210 causes the graphical API function call to be routed to screen capture program module 37a, and the method proceeds to step 215.

At step 215, the hook created at step 210 for the graphical API function call is removed. Removing the hook is done to prevent an endless loop involving the graphical API function call. If the hook was not removed at step 215, then the graphical API function call would always be diverted to the screen capture program module 37a and would never be executed.

After the hook for the graphical API function call is removed at step 215, method 200 proceeds to decision step 217. At decision step 217, it is determined whether any initial state parameters need to be saved before the graphical API function call is called. It should be understood that a graphical API function call may require that another API function call be called prior to that graphical API function call. The prior API function call may contain initial state parameters that are necessary for the graphical API function call to be executed. However, if the prior API function call is not a graphical API function call, it will not have been "hooked" and will not have been encoded by the screen capture program module 37a. Thus, it is important to determine at step 217 whether any initial state parameters need to be saved.

For example, the graphical API function call LineTo( ) displays a line. LineTo( ) requires the prior API function call MoveToo to set the initial screen position from which the line will be drawn. However, the API function call MoveTo( ) may not be considered a graphical API function call and may not be hooked by method 200 because it does not actually display or draw anything on monitor 47. However, it is still important that the graphical API function call LineTo( ) know the initial position from which to start drawing. Thus, in this example, at step 217, it is determined that initial state parameters, such as the initial screen position, need to be saved. For example, the current cursor position is obtained by calling the GetCurrentPosition(hdc) API.

If it is determined that an initial state parameter does not need to be saved at decision step 217, then the method 200 proceeds to step 225. However, if it is determined that an initial state parameter(s) needs to be saved at decision step 217, then the method 200 proceeds to step 220. At step 220, the initial state parameter(s) is saved in a record and the method proceeds to step 225. Records are described in more detail below.

The graphical API function call is called at step 225. The graphical API function call was intercepted due to the hook, so the graphical API routine was never executed. The graphical API routine may now be executed via the graphical API function call because the hook was removed at step 215. After the graphical API function call is called at step 225, the method proceeds to decision step 230.

At decision step 230, it is determined whether or not the graphical API function call was successful. In other words, it is determined whether the graphical API function call was actually executed. Preferably, the return code of the graphical API function call is checked to determine whether or not the graphical API function call was successful. If the graphical API function call was not successful, then the graphical API function call made no change to the display on monitor 47 and, thus, the graphical API function call does not need to be captured. Thus, if, at decision step 230, it is determined that the graphical API function call was not successful, then the method proceeds to step 235. The hook for the graphical API function call is restored at step 235 and the method returns to decision step 213.

However, if, at decision step 230, it is determined that the graphical API function call was successful, then the method proceeds to decision step 240 of FIG. 2B via node A. It should be understood that node A is simply a visual aid to connect the steps of method 200 illustrated in FIG. 2A to the remaining steps of method 200 illustrated in FIG. 2B, and that node A is not a step of method 200.

Referring now to FIG. 2B, at decision step 240, it is determined whether the graphical API function call was directed to the display of monitor 47 or an offscreen buffer. A graphical API function call that is directed to an offscreen buffer does not need to be captured and encoded because it does not affect what is displayed on the monitor 47.

If, at decision step 240, it is determined that the graphical API function call is directed to an offscreen buffer, then the graphical API function call is not captured and the method proceeds to step 235 (FIG. 2A) via node B. It should be understood that node B is simply a visual aid to connect the steps of method 200 illustrated in FIG. 2B to the steps of method 200 illustrated in FIG. 2A, and that node B is not a step of method 200.

However, if, at decision step 240, it is determined that the graphical API function call is directed to the display on monitor 47, then the method proceeds to decision step 245.

At decision step 245, it is determined whether any dependent graphical objects of the graphical API function call are marked as dirty. Dirty, as more fully explained below, refers to a graphical object that has changed since it was last encoded and must be reencoded. Clean, on the other hand, refers to a graphical object that has not changed since it was last encoded and does not need to be reencoded. It should be understood that a graphical API function call may contain a number of dependent graphical objects. A dependent graphical object is used in executing a graphical API routine. Dependent graphical objects may include brushes, pens, fonts, bitmaps, palettes, clip regions, and cursors, among others. Dependent objects may also include SETWNDORG (window origin), SETVPORTORG (viewport origin), SETTEXTCOLOR (text color), SETTEXTALIGN (text alignment), SETTEXTJUSTIFICATION (text justification), SETBRUSHORG (brush origin), SETMAPMODE (coordinate mapping mode).

Figure 3:
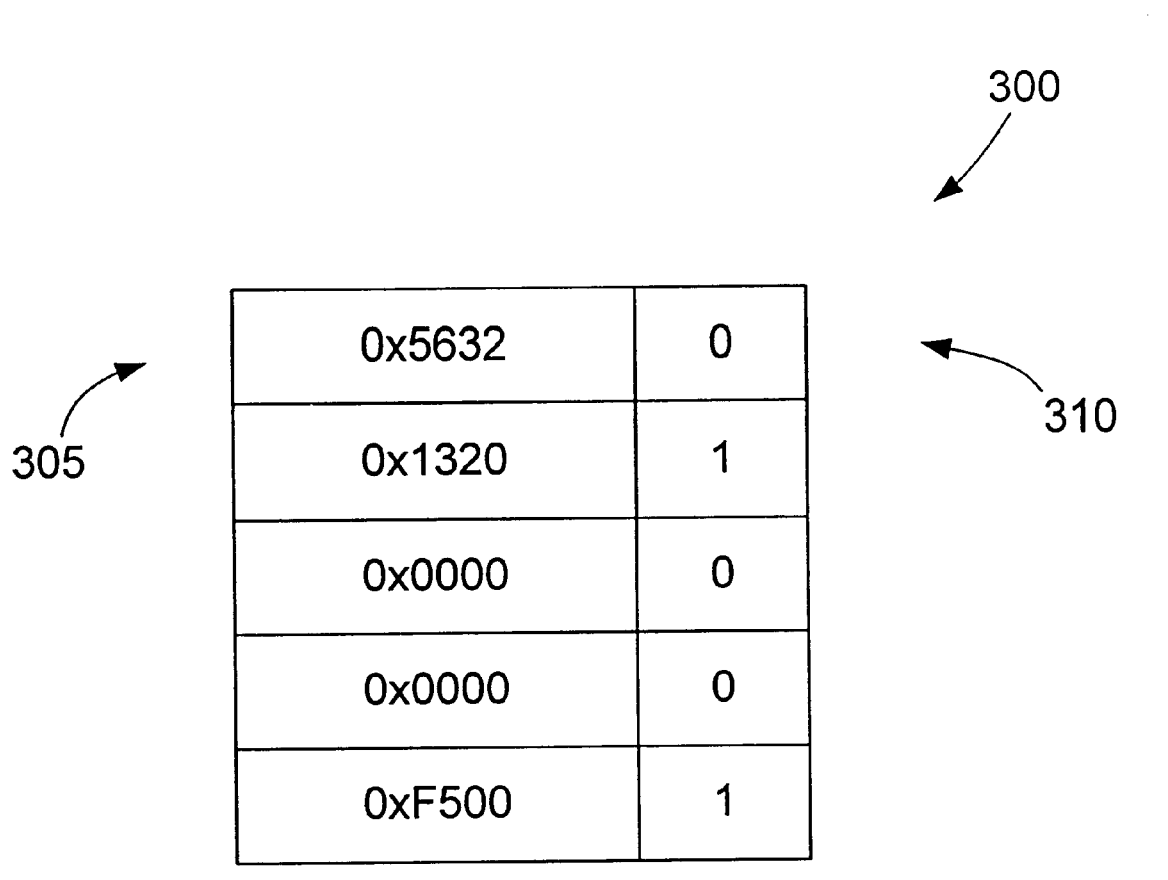

Referring now to FIG. 3, embodiments of the present invention may maintain a tracking table 300 of graphical objects for tracking changes to graphical objects. The table may be a 64 kilobyte table comprising a plurality of slots 310. Each graphical object may have its own unique handle 305 that is stored in the table in association with a slot. Each handle 305 is usually 16 bits in length. The value of the bit stored in a slot signifies whether the graphical object is dirty or clean. A zero in a slot signifies that the corresponding graphical object is dirty and a one in a slot signifies that the corresponding graphical object is clean. A clean indication signifies that the graphical object has not changed since it was last encoded. Thus, a clean graphical object does not need to be encoded again. A dirty indication signifies that the graphical object has changed since it was last encoded. Thus, a dirty graphical object needs to be encoded again. For example, if an application program module is displaying a bitmap, such as via the graphical API function call BitBlt, the bitmap will be written out once into a record in the present invention. Records will be described below in detail in reference to step 260 (FIG. 2B). If the bitmap never changes it will remain clean and does not need to be written out again. However, if the bitmap changes or has not been written out yet, then the bitmap handle will have a dirty indication in its associated slot. In that case, a CreateBitmap record would be created and the bitmap would be encoded as being clean. Then, a BitBlt record that describes the graphical API function call that was called may be encoded. When method 200 begins, every graphical object in the table is marked as dirty.

Referring once again to FIG. 2B, if, at decision step 245, it is determined that no dependent objects of the graphical API function call are dirty, then the method proceeds to step 260. However, if, at decision step 245, it is determined that a dependent object(s) of the graphical API function call is dirty, then the method 200 proceeds to step 250.

At step 250, a new record(s) is stored for the dirty graphical object(s). Records are described in detail below in reference to step 260.

After a new record(s) is stored for the dirty graphical object(s) at step 250, the method proceeds to step 255. At step 255, the graphical object(s) that was stored at step 250 is marked as clean. In other words, at step 255, the slot(s) corresponding to the graphical object(s) that was stored is marked with a clean indication, such as by storing a one in a slot of table 300 (FIG. 3). The method then proceeds to step 260.

At step 260, the graphical API function call is stored in a record and the method proceeds to step 235 (FIG. 2A) via node B. Preferably, a series of buffers is used to store the records. Each graphical API function call is captured as a single record. Preferably, each record has an initial byte that identifies the record by a unique identification number. Each record also preferably has an indication of the length of the record. Each record also preferably has a time stamp which identifies where the record occurs in the video stream. Each record also comprises data that makes up the record. For example, a CreateBitmap record would contain bitmap data that defines the size of a bitmap, the colors of the bitmap, etc. Other data that is captured comprises string position, the pen used to draw, the origin of coordinate system, just to name a few. For example, for the API function call ELLIPSE, the data stored in the record would appear as follows:

```
typedef struct _tagELLIPSE      /*----p*/
{
short nLeft;
short nTop;
short nRight;
short nBottom;
//--------
_HPEN hpen;
_HBRUSH hbrush;
} ELLIPSE, huge *LPELLIPSE;
    /* sizeof(ELLIPSE) */
```

All parameters that are needed to playback that API function call are saved. In some embodiments, the present invention also may comprise a timer running in the background which periodically instructs the buffer to save its contents to disk.

As an example, of encoding records, consider the following graphical API function call:

BitBlt(hdc, nLeft, nTop, nWidthDest, nHeightDest, hdcMem, nWidthSrc, nHeightSrc, nRop)

The above BitBlt graphical API function call draws a bitmap to the display of monitor 47. The bitmap object referenced by the graphical API function call is hdcMem. Before encoding the record for the above BitBlt graphical API function call, tracking table 300 is checked to determine whether any dependent graphical objects of the BitBlt graphical API function call need to be encoded. If the tracking table 300 indicates that hdcMem is dirty, then it is encoded as a record. Similarly, it may be determined that the coordinate system needs to be encoded as an initial state parameter.

Consequently, records would be encoded into a frame buffer in the following order:

[SETVIEWPORTORG, x, y]
[SETVIEWPORTEXT, x, y]
[CREATEBITMAP, 0xBE0, bitmap info]
[BITBLT, left, top, widthDest, heightDest, 0xBE0, widthSrc, rop]

Although not shown in the flowcharts of FIGS. 2A and 2B, it should be understood that the method 200 may end when the user ends the screen capturing process, such as when the user presses a "STOP" button on the remote control-type icon described above.

Having described a method 200 for capturing and encoding full-screen video graphics in accordance with an embodiment of the present invention, a method for hooking a graphical API function call (step 210 of FIG. 2A) will be described in reference to FIG. 4.

Figure 4:
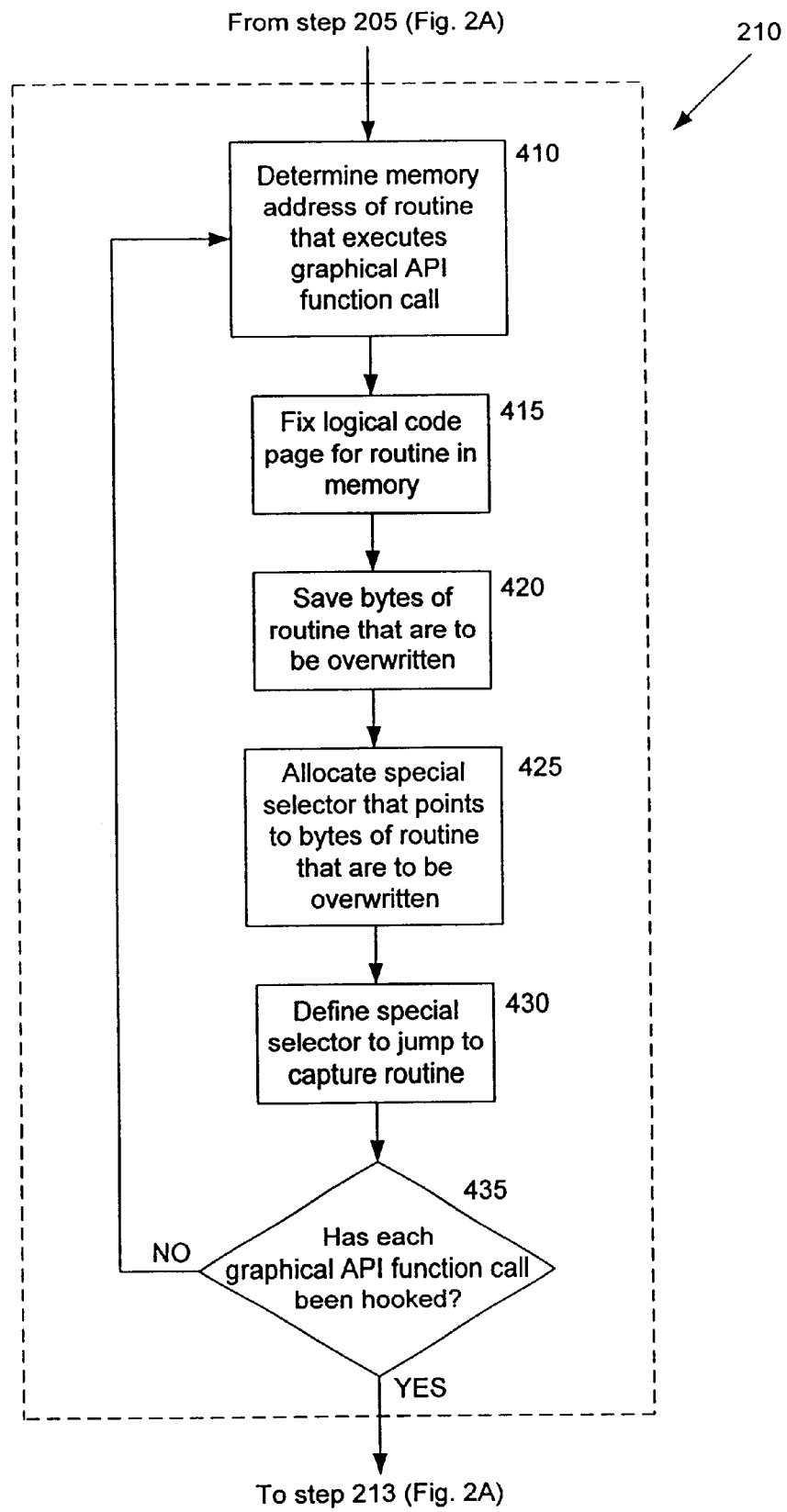
FIG. 4 is a flowchart illustrating a method for hooking a graphical API function call.

Referring now to FIG. 4, a method for hooking a graphical API function call (step 210 of FIG. 2A) will be described. The method begins at step 410 where the memory address of the graphical API routine that executes the graphical API function call is determined, and the method proceeds to step 415.

At step 415, a logical code page for the graphical API routine is fixed in memory. It should be understood that the logical code page is fixed in memory so that it is not lost due to the following circumstances. Typically, an operating system memory manager segments available memory into logical code pages. Each logical code page is typically 4 kilobytes in length. As memory gets low, the operating system takes the contents of certain logical code pages and writes them out to disk. The operating system typically writes the contents of a logical code page into a "swap file" and keeps track of its location. Then, the operating system is free to reallocate the logical code page's physical memory to another application program module. The operating system recognizes that a logical code page which contains actual binary executable (program) code is not ordinarily going to change. Moreover, the operating system recognizes that the binary executable code is already on disk in the form of executables, such as EXE files and dynamic-link libraries, or DLLs. Thus, the operating system recognizes that it can simply discard those logical code pages. The rationale is that, if the logical code pages are needed again, the operating system can simply reload them from the EXE files or dynamic-link libraries from which they originated. This is an operating system optimization intended to reduce the number of logical code pages that need to be written into "swap files" because disk input/output (I/O) is one of the slowest links in computer performance.

However, this optimization must be de-activated in certain circumstances in the present invention because the present invention overwrites executable logical code pages in the method of hooking graphical API function calls. If the logical code pages which have been hooked are simply discarded by the operating system when memory resources are low and reloaded from disk later on, the hooks will have disappeared. Thus, the solution that the present invention employs is to prevent the operating system from discarding those logical code pages in the first place. Step 415 is accomplished by calling an operating system API function call named GlobalFix( ) which instructs the operating system to leave those logical code pages alone.

After the logical code page for the routine is fixed in memory at step 415, the method proceeds to step 420. At step 420, the bytes of the graphical API routine that are to overwritten in the "hooking" are saved in memory. These bytes are saved so that the "hook" may later be undone (see step 215 of FIG. 2A) so that the graphical API routine may be executed normally (see step 225 of FIG. 2A).

After the bytes of the graphical API routine that are to overwritten in the "hooking" are saved in memory at step 420, the method proceeds to step 425. At step 425, a special selector is allocated. The special selector points to the bytes of the graphical API routine that are to be overwritten. A special selector is an alias that points to the bytes of the graphical API routine that are to be overwritten. A special selector is used because typically the bytes of the graphical API routine may not be edited directly. The special selector is allocated through the following API function call: AllocCStoDSAlias( ). The method then proceeds to step 430.

At step 430, the special selector is defined with instructions so that whenever the graphical API routine is called it will jump to the appropriate subroutine in screen capture program module 37a (FIG. 1). The method then proceeds to decision step 435.

At decision step 435, it is determined whether each graphical API function call has been hooked. If not, then the method returns to step 410 and another graphical API function call is hooked. However, if all the graphical API function calls have been hooked, then the method proceeds to step 213 of FIG. 2A.

As an example of the hooking process, suppose we want to hook the graphical API function call BitBlt whose graphical API routine is generally as follows:

| BitBlt: | push bp |
|---|---|
| | mov bp, sp |
| | push si |
| | . . . etc . . . |

Using a special selector, the first few operating codes of the graphical API routine are overwritten so that any call to the routine is redirected to the subroutine MyBitBlt in screen capture video program module 37a:

| BitBlt: | jmp MyBitBlt |
|---|---|
| | push si |
| | . . . etc . . . |

The operating codes of the subroutine MyBitBlt may appear generally as follows:

MyBitBlt:
    //we just intercepted call
    //now restore the handler
    RestoreHandler(BitBlt)
    x=BitBlt(hdc, 100, 200, 100, 200, hdcMem, 100, 200, SRCOPY)
    HookHandler(BitBlt);
    return x;

As shown in operating codes of the subroutine MyBitBlt, the "hook" is undone once the call reaches the subroutine MyBitBlt.

Figure 5:
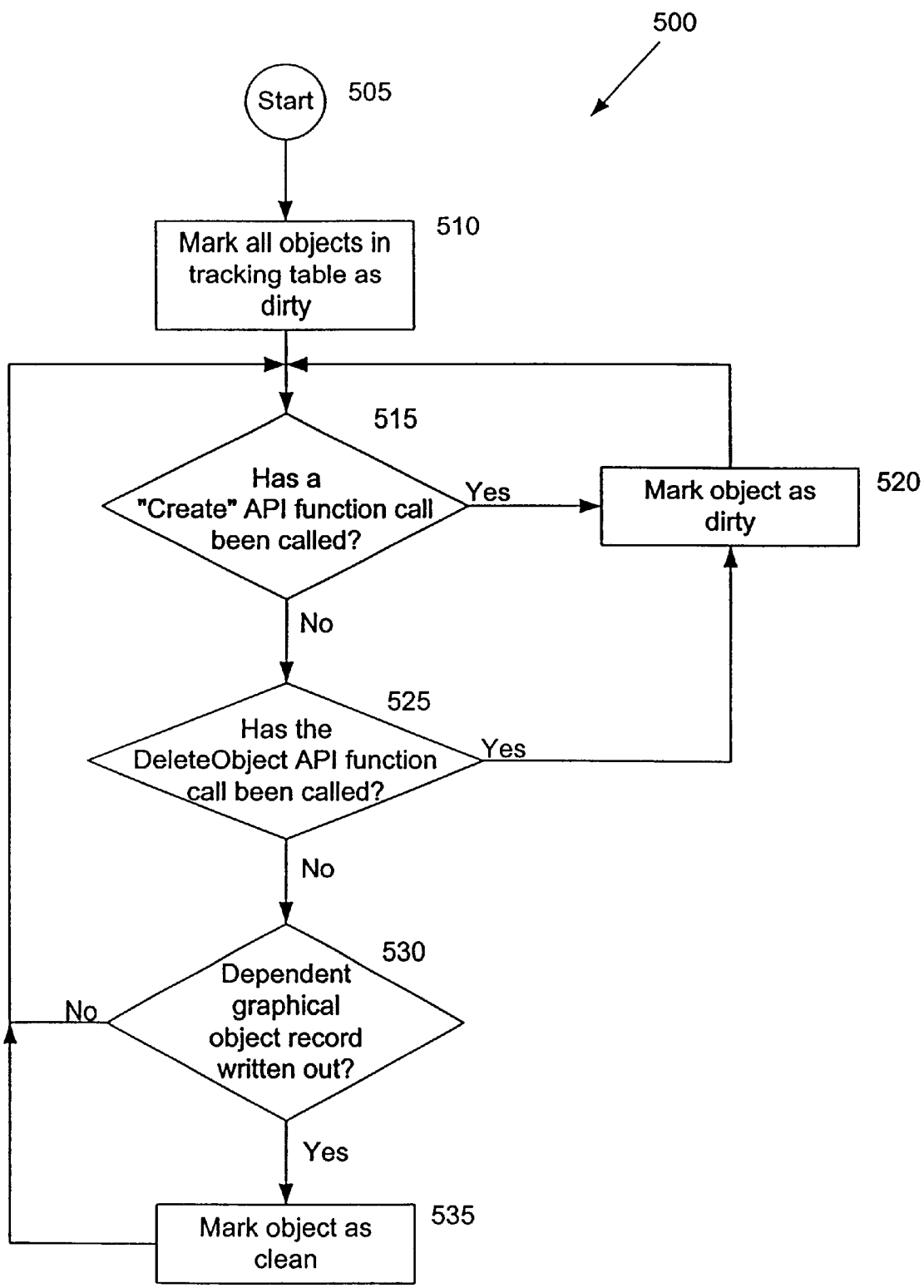
FIG. 5 is a flowchart illustrating a method for updating the tracking table.

Referring now to FIG. 5, a flowchart illustrating the method 500 for updating the tracking table 300 (FIG. 3) is described. The method 500 begins at step 505 and proceeds to step 510 when a user begins the screen capture video process, such as by selecting a "RECORD" button displayed on monitor 47 by screen capture program module 37a.

At step 510, all the graphical objects in the tracking table are marked as dirty. Preferably, step 510 is accomplished by placing a zero in every slot 310 of the tracking table 300. After all the graphical objects in the tracking table are marked as dirty, then the method proceeds to decision step 515.

At decision step 515, it is determined whether a "Create" API function call has been called. A "Create" API function call is a function call that creates a new graphical object, such as CreateBitmap, CreateFont, CreatePatternBrush, CreateBrush, etc. If a "Create" API function call has been called, then the method proceeds to step 520.

At step 520, the graphical object that was created by the "Create" API function call is marked as dirty. Step 520 is accomplished by determining the returned handle of the created graphical object and storing a zero in association with that returned handle. After step 520, the method returns to decision step 515.

If, at decision step 515, it is determined that a "Create" API function call has not been called, then the method proceeds to decision step 525.

At decision step 525, it is determined whether the DeleteObject function call has been called. If so, then the method proceeds to step 520. At step 520, the graphical object that was deleted is marked as dirty. Preferably, step 520 is accomplished in this instance by determining the returned handle of the deleted graphical object and storing a zero in association with that returned handle. If, at decision step 525, it is determined that the DeleteObject function call has not been called, then the method proceeds to decision step 530.

At decision step 530, it is determined whether a dependent graphical object record has encoded, such as at step 250 (FIG. 2B) of method 200. If so, then the method proceeds to step 535. If not, then the method returns to decision step 515.

At step 535, the dependent graphical object that was encoded is marked as clean. Preferably, step 535 is accomplished by determining the returned handle of the dependent graphical object and storing a one in association with that returned handle. The method then returns to decision step 515.

Although not shown in the flowchart of FIG. 5, it should be understood that the method 500 may end when the user ends the screen capturing process, such as when the user presses a "STOP" button on the remote control-type icon described above. It should further be understood that method 500 is preferably starts and is performed at the same time that method 200 (FIG. 2) is being performed.

The present invention may also comprise a decoding process for viewing the captured full-screen graphics. The decoding process is basically the converse of the encoding process described above. The decoding process includes a decoding table that cross-references the handle used to identify each encoded graphical object with the "real" handle for the graphical object.

In decoding, the records encoded for the initial state parameters, graphical objects and graphical API function calls will be read. Preferably, the time stamp which identifies where the record occurs in the video stream may be used to play the screen capture video in the proper order.

On playback, the decoder will use a decoding table (not shown). As the decoder reads a record that creates a graphical object, such as CreateBitmap, the decoder places the handle returned from CreateBitmap and places it in an appropriate slot in the decoding table. For example, suppose the appropriate slot in the decoding table is 0xBE0 and CreateBitmap returns a handle of 0xF500. The decoder would place the value 0xF 500 in to slot 0xBE0 of the decoding table. Thus, when the subsequent BitBlt record is read, the decoder would look in slot 0xBE0 of the decoding table to obtain the real handle to the bitmap. This is done so that subsequent records will have a way to reference preceding records. A standard AVI reader would require that the decoder of the present invention decode the records contained in a single video frame. The AVI reader is solely responsible for reading the video frames from the AVI file. The AVI reader hands off each frame one-by-one for the decoder to decode. The decoder of the present invention decodes the graphical records by executing the contained API function calls in sequence into a graphical output buffer. The AVI reader then displays the graphical output buffer within a screen window.

Figure 6:
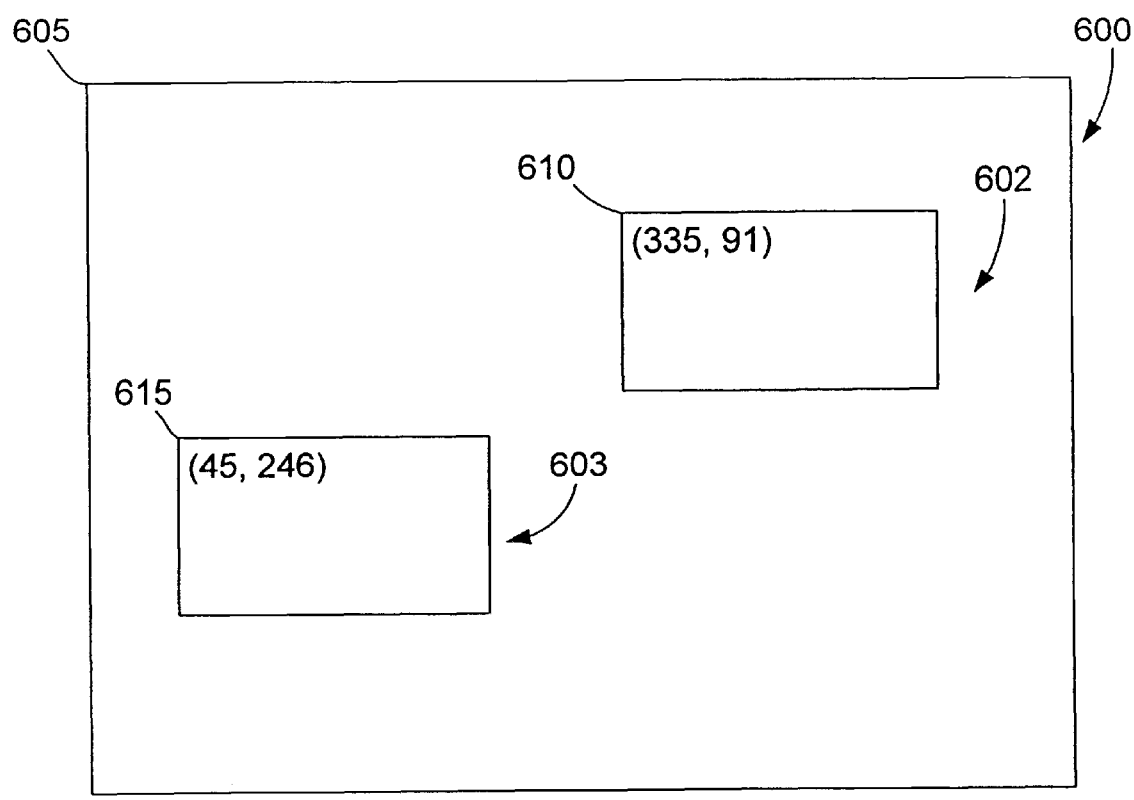
FIG. 6 is an illustration of a display of a monitor including two windows for two separate application program modules.

The decoding process also includes a mapping from individual application coordinate systems to a single virtual coordinate system described below in reference to FIG. 6. An illustration of a display 600 of a monitor, such as monitor 47, including two windows 602, 603 for two separate application program modules.

The window 602 is a window for application program module A and the window 603 is a window for application program module B. Because the present invention captures and encodes what is on the display 600, rather than individual application program modules, it is important that the decoding process include a mapping method from individual application program module coordinate systems to a single virtual coordinate system. For example, the window 602 for application program module A is located at point 610 (335, 91), and the window 603 for application program module B is located at point 615 (45, 246).

From the perspective of application program module A, the origin of its coordinate system is the upper left-hand corner of window 602. In other words, application program module A considers its coordinate system origin to be point 610. Similarly, application program module B considers its coordinate system origin to be point 615. Thus, if these application program modules were to display an object at point (0,0), application program module A would display it at point 610 and application program module B would display it at point 615. However, the present invention treats the entire display 600 as a single window and considers the origin to be point 605. Thus, the present invention remaps the coordinate system to suit the output of individual application program modules.

Thus, if an application program module remaps a viewport, then the present invention may bias the viewport by the origin of the application program module coordinate system. Consider the following examples in reference to FIG. 6:

for application program module A, newViewport.x=appViewport.x +335 newViewport.y=appViewport.y +91 for application program module B, newViewport.x=appViewport.x +45 newViewport.y=appViewport.y +246

This remapping ensures that, no matter what an individual application program module does to its own coordinate system, the present invention will simply map on-the-fly as it is capturing output from different application program modules. Thus, the encoded output will be indistinguishable from that produced by a single application program module. It should be noted that the reason that the viewport remapping occurs is that it eliminates the need for remapping the parameters for each captured API function call. For example, let's say that an application displays text at logical coordinates (100,200) by calling TextOut(hdc, 100, 200, . . . ). Those coordinates are relative to the application's coordinate system—not the screen. Unless the present invention remaps the viewport to match the application viewport, it would have to translate logical coordinates (100,200) to screen coordinates for each coordinate parameter in each API function call; that is, TextOut(hdc, 100+DCViewporgOrgX,200+ DCViewportOrgX, . . . ).

From the foregoing description, it will be apparent to those skilled in the art that the present invention provides a method and system for capturing and encoding full-screen graphics into an electronic file, preferably an AVI file. It will also be apparent to those skilled in the art that the present invention provides a lossless screen capture mechanism.

It will further be apparent to those skilled in the art that the present invention provides a method and system for capturing and encoding full-screen graphics into an electronic file that does not overburden the processing unit. Thus, execution speed of the processing unit is not overburdened and the user does not notice a slow-down in the execution speed of the computer.

It will further be apparent to those skilled in the art that the present invention provides a method and system for capturing and encoding full-screen graphics into an electronic file that conserve the amount of memory and disk storage required for a screen capture video. It will still be further apparent that the present invention does not require a copy buffer because no difference analysis is performed on the frames. It will also be apparent that the present invention recognizes palette changes and may adjust the color of objects as appropriate.

It should be understood that more than one graphical object for a given graphical API function call may need to be written out if the graphical API function call is dependent upon more than one dirty graphical object. It should be further understood that every dependent object that the graphical API function call is dependent upon needs to be checked to determine whether or not it is dirty. It should still further be understood that if a dependent object is found to be clean, then the unique handle of the dependent object is written into the record for the graphical API function call.

Although the present invention has been described above as implemented in the application program module, it will be understood that alternative embodiments will become apparent to those skilled in the art to which the present invention pertains without departing from its spirit and scope. Accordingly, the scope of the present invention is defined by the appended claims rather than the foregoing description.

What is claimed is:

1. A method for encoding video graphics of a computer system including a monitor, the video graphics being displayed on the monitor by a plurality of graphical application programming interface (API) routines executed in response to a plurality of graphical API function calls, the method comprising the steps of:

hooking the plurality of graphical API function routines;

determining that one of the plurality of graphical API routines has been called in response to one of the plurality of graphical API function calls and diverting the one graphical API function call to an encoding subroutine; and storing the graphical API function call in a record.

2. The method recited in claim 1, wherein the step of hooking the plurality of graphical API function routines comprises the steps of:

for each graphical API function routine that needs to be hooked:

determining a memory address of the graphical API routine associated with the graphical API function call;

fixing the memory address for the graphical API routine in memory;

saving a plurality of bytes of the graphical API routine that are to be overwritten; and overwriting the plurality of bytes of the graphical API routine.

3. A computer-readable medium having computer-executable instructions for performing the steps recited in claim 1.

4. The method recited in claim 1, wherein under the control of the encoding subroutine, the method further comprises the step of:

unhooking the one graphical API routine;

determining whether any initial state parameters need to be stored and, if so, then storing the initial state parameters;

calling the one graphical API function routine;

determining whether the one graphical API function routine was successfully executed and, if not, then restoring the hook to the one graphical API function routine;

if the one graphical API function routine was successfully executed, then determining whether the graphical API function routine was directed to the monitor and, if not, then restoring the hook to the one graphical APT function routine; and if the graphical API function routine was directed to the monitor, then determining whether there are any dependent objects of the graphical API function routine that need to be stored and, if so, then storing the dependent objects in records.

5. The method recited in claim 4, wherein the step of determining whether the one graphical API function routine was successfully executed comprises checking the return code of the one graphical API function routine.

6. The method recited in claim 4, wherein the step of determining whether there ate any dependent objects of the graphical API function routine that need to be stored comprises the steps of:

determining whether a dependent object of the graphical API function routine is dirty; and if so, then storing a new record for the dependent object.

7. The method recited in claim 6 further comprising the step of marking the dependent object as clean.

8. A method for capturing and redisplaying full-screen video graphics of a computer system, the method comprising the steps of:

hooking a plurality of graphical application program interface function routines;

determining that one of said plurality of graphical application program interface routines has been called in response to one of a plurality of graphical application program interface function calls;

diverting the one graphical application program interface function routine to an encoding subroutine;

unhooking the one graphical application program interface function routine under control of said encoding subroutine;

storing in one or more records of at least one initial state parameters, dependent objects of the one graphical application program interface function routine, and the one graphical application program interface function call under control of said encoding subroutine;

reading said one or more stored records with a decoding subroutine; and displaying the stored video graphics on said monitor in accordance with said decoding subroutine.

9. The method of claim 8, further comprising the steps of:

calling the one graphical application program interface function routine; and determining whether the one graphical application program function routine was successfully executed, and, if not, then restoring the hook to the one graphical application program interface function routine.

10. The method of claim 8, further comprising the step of:

if the one graphical application program interface function routine was successfully executed, then determining whether the graphical application program interface function routine was directed to the monitor, and, if not, then restoring the hook to the one graphical application program interface function routine.

11. The method of claim 8, wherein the step of storing further comprises the step of:

if the graphical application function routine was directed to the monitor, then determining whether there are any dependent objects of the graphical application program interface function routine that need to be stored, and, if so, then storing the dependent objects in records.

12. The method of claim 8, wherein the step of hooking each graphical application program interface function routine of said plurality of graphical application program interface function routines comprises the steps of:

for each graphical application program interface function routine, determining a memory address of a respective graphical application program interface routine associated with a respective graphical application program interface function call;

fixing the memory address for the graphical application program interface routine in memory;

saving a plurality of bytes of the graphical application program interface routine that are to be overwritten; and overwriting the plurality of bytes of the graphical application program interface routine.

* * * * *

UNITED STATES PATENT AND TRADEMARK OFFICE
CERTIFICATE OF CORRECTION

PATENT NO.    : 6,421,738 B1  
DATED         : July 16, 2002  
INVENTOR(S)   : Ratan et al.

It is certified that error appears in the above-identified patent and that said Letters Patent is hereby corrected as shown below:

Column 8,
Line 12, "MoveToo" should read -- MoveTo( ) --

Column 9,
Line 53, "BitBIt" should read -- BitBlt --

Column 16,
Line 28, "there ate any" should read -- there are any --

Signed and Sealed this

Tenth Day of December, 2002

JAMES E. ROGAN
*Director of the United States Patent and Trademark Office*